United States Patent
Anderson et al.

(10) Patent No.: US 7,549,836 B2
(45) Date of Patent: Jun. 23, 2009

(54) BEARING SEAL WITH BACKUP DEVICE

(75) Inventors: James H. Anderson, Vernon, CT (US); Harrison R. Picard, East Granby, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/524,101

(22) Filed: Sep. 20, 2006

(65) Prior Publication Data

US 2008/0001364 A1    Jan. 3, 2008

Related U.S. Application Data

(62) Division of application No. 10/801,237, filed on Mar. 16, 2004, now abandoned.

(51) Int. Cl.
*F04D 29/10* (2006.01)

(52) U.S. Cl. .................. 415/113; 415/231; 277/500; 277/503

(58) Field of Classification Search .................. 415/110, 415/111, 113, 174.2, 174.3, 230, 231; 277/543, 277/544, 545, 548, 500, 503
See application file for complete search history.

(56) References Cited

U.S. PATENT DOCUMENTS

| | | | |
|---|---|---|---|
| 1,317,294 A | 9/1919 | Hildebrand | |
| 1,331,360 A | 2/1920 | Algernon et al. | |
| 1,331,552 A | 2/1920 | Algernon et al. | |
| 1,332,062 A | 2/1920 | Algernon et al. | |
| 1,828,178 A | 10/1931 | Fox | |
| 2,621,087 A | 12/1952 | Kluge | |
| 3,076,659 A | 2/1963 | Kremer, Jr. | |
| 3,501,245 A | * | 3/1970 | Ivanko .................. 184/6.11 |
| 4,482,158 A | 11/1984 | Ishitani et al. | |
| 4,501,430 A | 2/1985 | Kuhl et al. | |
| 4,706,971 A | 11/1987 | Schirmer | |

(Continued)

FOREIGN PATENT DOCUMENTS

EP    0 803 668 A1    10/1997

(Continued)

OTHER PUBLICATIONS

European Search Report, Jun. 16, 2005.

*Primary Examiner*—Edward Look
*Assistant Examiner*—Nathaniel Wiehe
(74) *Attorney, Agent, or Firm*—Carlson, Gaskey & Olds

(57) ABSTRACT

A bearing seal assembly includes a pair segmented circumferential or a carbon ring seals to contain oil in the bearing compartments of a gas turbine engine or other mechanical device. The pair of seals, an oil-side seal and an air-side seal, are axially-spaced between the oil and the air in the housing. Air at an elevated pressure is introduced between the seals. This elevated air pressure urges the seals axially apart from one another and radially inward to improve the seal. A backup seal is provided adjacent either the oil-side seal or the air-side seal. In the event of failure of either the oil-side seal or the air-side seal which results in the loss of air pressure, the backup seal will provide at least a minimum level of seal between the oil compartment and the air in the housing.

7 Claims, 2 Drawing Sheets

U.S. PATENT DOCUMENTS

| | | | |
|---|---|---|---|
| 5,301,957 A | 4/1994 | Hwang et al. | |
| 5,344,160 A | 9/1994 | Scarlata et al. | |
| 6,431,550 B1 * | 8/2002 | Tong | 277/346 |

FOREIGN PATENT DOCUMENTS

| GB | 2 140 880 A | 12/1984 |
|---|---|---|
| JP | 59-115433 | 7/1984 |
| JP | 59-231141 | 12/1984 |
| JP | 10-169781 | 6/1998 |

* cited by examiner

BEARING SEAL WITH BACKUP DEVICE

This application is a divisional of U.S. Ser. No. 10/801,237 filed on Mar. 16, 2004 now abandoned.

This invention was conceived in performance of work under U.S. Government Contract F33657-91-C-007.

BACKGROUND OF THE INVENTION

The present invention relates generally to bearing seals and more particularly to a turbine engine bearing seal with a backup device.

Segmented circumferential or a carbon ring seals are sometimes used to contain oil in the bearing compartments of a gas turbine engine or other mechanical device. A pair of axially-spaced seals are provided between the oil and the air in the housing, an oil-side seal and an air-side seal. In order to provide proper operation of the seals, air at an elevated pressure is introduced between the seals. This elevated air pressure urges the seals axially apart from one another and radially inward to improve the seal.

In the event of failure of either of the seals, the elevated air pressure is lost, thereby significantly reducing the effectiveness of the seal. This can result in the escape of oil from the oil compartment. Even a slight failure of one of the seals can cause a loss of air pressure, which in turn can result in a loss of oil from the oil compartment.

SUMMARY OF THE INVENTION

The present invention provides an improved bearing seal assembly. A backup seal is provided adjacent either the oil-side seal or the air-side seal. In the event of failure of either the oil-side seal or the air-side seal which results in the loss of air pressure, the backup seal will provide at least a minimum level of seal between the oil compartment and the air in the housing.

BRIEF DESCRIPTION OF THE DRAWINGS

Other advantages of the present invention can be understood by reference to the following detailed description when considered in connection with the accompanying drawings wherein.

DETAILED DESCRIPTION OF A PREFERRED EMBODIMENT

Figure 1:
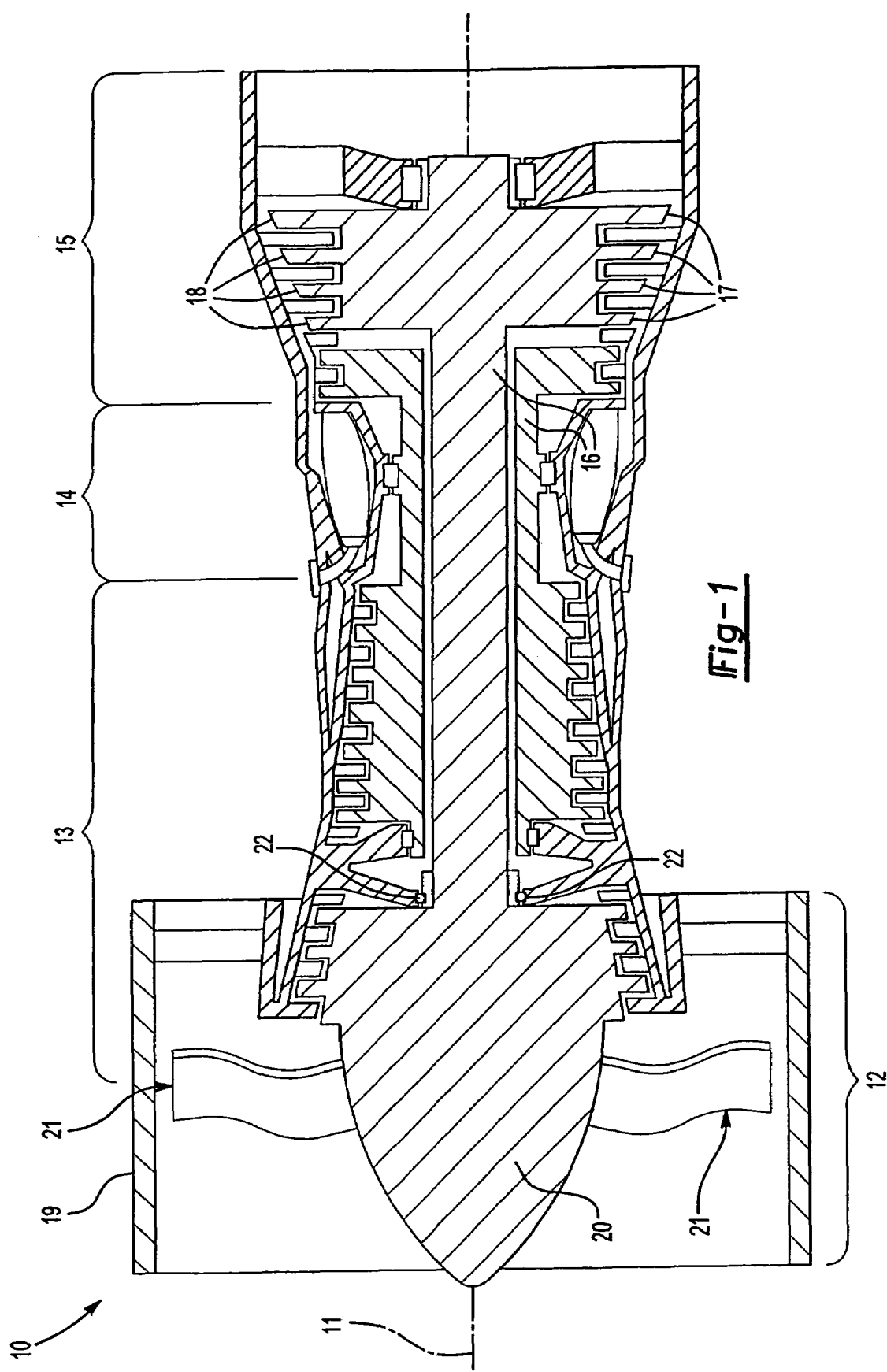
FIG. 1 is a schematic illustrating the bearing seal assembly of the present invention in a gas turbine engine.

A bearing seal assembly 22 in accordance with the present invention is shown installed a gas turbine engine 10 in FIG. 1. A gas turbine engine 10, such as a turbofan gas turbine engine, circumferentially disposed about an engine centerline, or axial centerline axis 11 is shown. The engine 10 includes a fan 12, a compressor 13, a combustion section 14 and a turbine 15. As is well known in the art, air compressed in the compressor 13 is mixed with fuel which is burned in the combustion section 14 and expanded in turbine 15. The air compressed in the compressor and the fuel mixture expanded in the turbine 15 can both be referred to as a hot gas stream flow. The turbine 15 includes rotors 16 which rotate in response to the expansion, driving the compressor 13 and fan 12. The turbine 15 comprises alternating rows of rotary airfoils or blades 17 and static airfoils or vanes 18.

The fan 14 is surrounded by a fan case 19 and includes a rotor assembly. The rotor assembly includes a rotor disk 20 and a plurality of fan blades 21. Each fan blade 21 extends radially outwardly from the rotor disk 20 across the working medium flow paths into proximity with the fan case 19.

Figure 2:
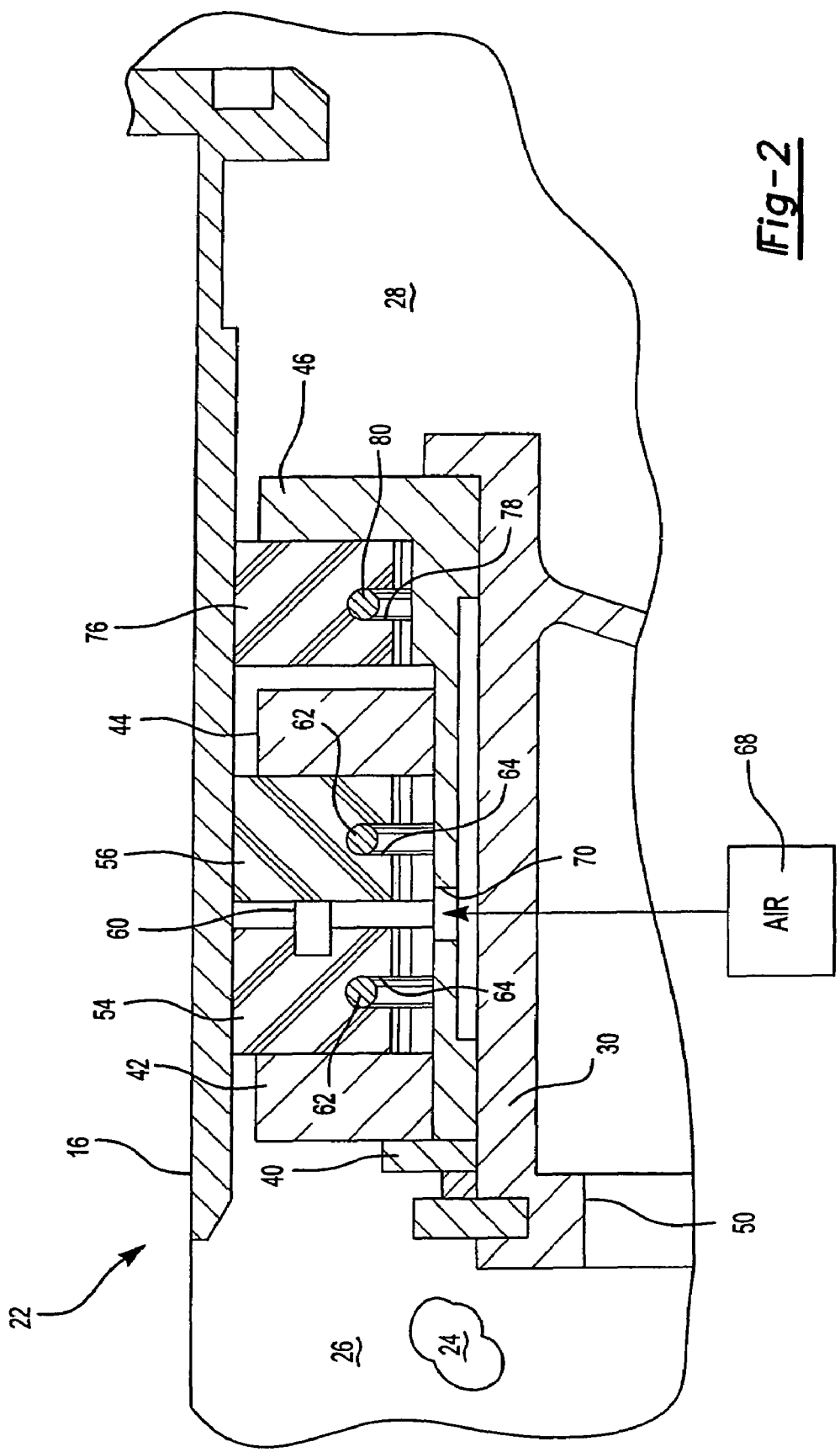
FIG. 2 is a more detailed view of the bearing seal assembly of FIG. 1.

Referring to FIG. 2, the bearing seal assembly 22 seals oil 24 in an oil compartment 26 from an air compartment 28. The bearing seal assembly 22 provides a seal between a housing 30 and a rotor 16. In other applications, the rotor 16 may be a shaft or any other rotating part.

The bearing seal assembly 22 is axially fixed between a snap ring 40 and washer 42 on the oil side and a snap ring 44 and an anti-rotation piece 46 on the air side. The bearing seal assembly 22 is also between a bracket 50 radially outward of the bearing seal assembly 22 and the rotor 16 radially inward of the bearing seal assembly 22.

The bearing seal assembly 22 includes an oil-side seal 54 and an air-side seal 56, axially spaced from one another. The seals 54, 56 may be segmented circumferential seals or carbon rings. The oil-side seal 54 seals against the rotor 16 and the anti-rotation piece 46. The air-side seal 56 seals against the rotor 16 and the anti-rotation piece 46. A spring 60 urges the seals 54, 56 axially outward from one another and assists in making the seals in the axial direction. Springs 62 in grooves 64 in the seals 54, 56 urge the seals 54, 56 radially inwardly against the rotor 16, to improve the radial seal.

Fluid, such as air, is introduced from a pressurized fluid source 68 axially between the seals 54, 56 through inlet 70 at an elevated pressure, above the pressure in oil compartment 26 and the air compartment 28. The pressurized air urges the seals 54, 56 axially outwardly from one another, thereby improving their axial seals. The pressurized air also urges the seals 54, 56 radially inwardly against the rotor 16, thereby increasing the radial seals.

In the present invention, a backup seal 76 is positioned adjacent the seals 54, 56. In the embodiment shown, the backup seal 76 is on the air side of the air-side seal 56, but it could also be located on the oil side of the oil-side seal 54. The backup seal 76 may also be a segmented circumferential seal or carbon ring and includes a groove 78 into which a spring 80 is received. The spring 80 urges the backup seal 76 radially inward toward the rotor 16, thereby improving the seal. The backup seal 76 is axially between the air-side seal 56 and the anti-rotation piece 46. The backup seal 76 is preferably made with slightly looser tolerances, such that, although it provides a less effective seal than that provided by the primary seals, oil-side seal 54 and air-side seal 56, it is likewise less likely to fail.

In the event of failure by either the oil-side seal 54 or the air side seal 56, the air pressure between them could be lost. The oil 24 from the oil compartment 26 would pass by oil-side seal 54 and air-side seal 56, but would be substantially retained by the backup seal 76. Although the backup seal 76 alone would not seal as well as the primary seals 54, 56, the backup seal 76 may at least delay a serious failure resulting from the loss of the air pressure between the primary seals 54, 56.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A bearing seal assembly for a gas turbine engine comprising:

a first seal;

a second seal axially spaced from the first seal, one of the first seal and the second seal contacting oil in an oil compartment of the gas turbine engine, the other of the first seal and the second seal contacting air in an air compartment of the gas turbine engine;

a fluid compartment between the first seal and the second seal, an inlet into the fluid compartment disposed between the first and second seals for supplying a fluid at an elevated pressure;

a third seal adjacent the first seal and outside the fluid compartment, the third seal and the first seal defining a closed, sealed compartment having a pressure that is lower than the pressure in the fluid compartment;

a bracket, the first seal, second seal and third seal positioned between the bracket on an outer circumference and a rotor on an inner circumference, the bracket including an opening in communication with the inlet to the fluid compartment between the first seal and the second seal; and a first snap-ring between the first seal and the third seal and a second snap-ring between the second seal and the oil compartment, the first seal urged against the first snap-ring by the pressurized fluid in the fluid compartment, the second seal urged against the second snap-ring by the pressurized fluid in the fluid compartment.

2. The bearing seal assembly of claim 1 wherein the first seal and the second seal bear radially inwardly against a rotor shaft in the gas turbine engine.

3. A gas turbine engine including the bearing seal assembly of claim 1 between the oil compartment of the gas turbine engine and the air compartment of the gas turbine engine.

4. A bearing seal assembly for a gas turbine engine comprising:

a first seal;

a second seal axially spaced from the first seal, one of the first seal and the second seal contacting oil in an oil compartment of the gas turbine engine, the other of the first seal and the second seal contacting air in an air compartment of the gas turbine engine;

a fluid compartment between the first seal and the second seal, an inlet into the fluid compartment disposed between the first and second seals for supplying a fluid at an elevated pressure;

a third seal adjacent the first seal and outside the fluid compartment, the third seal and the first seal defining a closed, sealed compartment having a pressure that is lower than the pressure in the fluid compartment;

a first snap-ring between the first seal and the third seal; and a second snap-ring between the second seal and the oil compartment, the first seal urged against the first snap-ring by the pressurized fluid in the fluid compartment, the second seal urged against the second snap-ring by the pressurized fluid in the fluid compartment.

5. A gas turbine engine including the bearing seal assembly of claim 4 between the oil compartment of the gas turbine engine and the air compartment of the gas turbine engine.

6. A bearing seal assembly for a gas turbine engine comprising:

a first seal bearing radially inwardly against a rotor shaft in the gas turbine engine;

a second seal axially spaced from the first seal and bearing radially inwardly against a rotor shaft in the gas turbine engine, one of the first seal and the second seal contacting oil in an oil compartment of the gas turbine engine, the other of the first seal and the second seal contacting air in an air compartment of the gas turbine engine;

a fluid compartment between the first seal and the second seal, an inlet into the fluid compartment disposed between the first and second seals for supplying a fluid at an elevated pressure;

a third seal adjacent the first seal and outside the fluid compartment, the third seal and the first seal defining a closed, sealed compartment having a pressure that is lower than the pressure in the fluid compartment;

a bracket, the first seal, the second seal and the third seal positioned between the bracket on an outer circumference and a rotor on an inner circumference, the bracket including an opening in communication with the inlet to the fluid compartment between the first seal and the second seal;

a first snap-ring between the first seal and the third seal; and a second snap-ring between the second seal and the oil compartment, the first seal urged against the first snap-ring by the pressurized fluid in the fluid compartment, the second seal urged against the second snap-ring by the pressurized fluid in the fluid compartment.

7. A gas turbine engine including the bearing seal assembly of claim 6 between the oil compartment of the gas turbine engine and the air compartment of the gas turbine engine.

\* \* \* \* \*